(12) United States Patent
Weinberg et al.

(10) Patent No.: US 11,399,276 B2
(45) Date of Patent: Jul. 26, 2022

(54) SYSTEM AND METHOD FOR SECURING COMMUNICATION AND INFORMATION OF IOT DEVICES THROUGH A CONTROLLED CELLULAR COMMUNICATION NETWORK

(71) Applicant: FirstPoint Mobile Guard Ltd., Gealya (IL)

(72) Inventors: Adam Weinberg, Netanya (IL); Dror Fixler, Ganei-Tikva (IL)

(73) Assignee: FIRSTPOINT MOBILE GUARD LTD., Gealya (IL)

( * ) Notice: Subject to any disclaimer, the term of this patent is extended or adjusted under 35 U.S.C. 154(b) by 474 days.

(21) Appl. No.: 16/424,966

(22) Filed: May 29, 2019

(65) Prior Publication Data

US 2019/0387399 A1    Dec. 19, 2019

Related U.S. Application Data

(60) Provisional application No. 62/677,242, filed on May 29, 2018.

(51) Int. Cl.
*H04W 12/02* (2009.01)
*H04W 12/128* (2021.01)
(Continued)

(52) U.S. Cl.
CPC ............ *H04W 12/02* (2013.01); *H04L 43/04* (2013.01); *H04L 43/06* (2013.01); *H04W 12/128* (2021.01)

(58) Field of Classification Search
CPC ... H04W 12/02; H04W 12/12; H04W 12/122; H04W 12/128; H04W 4/70; H04W 4/14;
(Continued)

(56) References Cited

U.S. PATENT DOCUMENTS

| | | | |
|---|---|---|---|
| 2017/0332232 A1* | 11/2017 | Weinberg | ............... H04W 4/14 |
| 2018/0026999 A1 | 1/2018 | Ruvio et al. | |
| 2018/0191746 A1* | 7/2018 | De Knijf | ............... H04L 63/102 |

FOREIGN PATENT DOCUMENTS

| | | |
|---|---|---|
| WO | 2017137881 A1 | 8/2017 |
| WO | 2017195201 A1 | 11/2017 |
| WO | 2018031928 A1 | 2/2018 |

\* cited by examiner

*Primary Examiner* — Muthuswamy G Manoharan
(74) *Attorney, Agent, or Firm* — Browdy and Neimark, P.L.L.C.

(57) ABSTRACT

The present invention provides a system for providing security services of IoT devices, said system comprising:
at computer device and one or more processors operatively coupled to the storage device on which are stored modules of instruction code which when executed by processors implements a Controlled Network, interfacing a IoT cellular Network, said Cellular Network hosting a plurality of IoT devices;
wherein said CN classifies and/or control IoT devices by their type, functionality or behavior;
wherein said ICN encapsulates communication in between IoT devices or with the IoT cellular Network or with enterprises devices, said communication including at least part of: control, and data communications;
wherein said CN is configured to monitor and analyze parameters and characteristics of said monitored communication in real time or in relation to historically acquired data, including at least one of: time patterns, volumes, destination address, source address, content and context.

12 Claims, 12 Drawing Sheets

(51) Int. Cl.
*H04L 43/04* (2022.01)
*H04L 43/06* (2022.01)
(58) Field of Classification Search
CPC ..... H04L 43/04; H04L 43/06; H04L 63/1425; H04L 63/1441; H04L 63/1466
See application file for complete search history.

Clustering IOT defined/functional network
module: 1900

| |
|---|
| Identifying IOT device functionality , organization , location , device type , connection characteristics(e.g. bandwidth ) . 1910 |

| |
|---|
| Tracking action performed by the IOT deice type of action , communication with other device, communication request 1920 |

| |
|---|
| (Clustering) dynamic classification of IOT groups device by functionality and behavior 1330 |

| |
|---|
| perform deep packet inspection for specific strings like social security numbers and GPS coordinates that might suggest that such information is not protected properly |

| |
|---|
| Identifying behavior patterns which indicate threats for each class . 1340 |

| |
|---|
| Define for each class security rules based on identified behavior patterns : examples<br>- Steering of Roaming (SoR) of IoT Endpoint devices for security purposes: transfer its outbound roaming Endpoint devices to another visited network, using the SoR mechanism;<br>- signaling storms pattern: prevent certain devices from connecting to their network by changing the communication profile of the affected devices or by enacting security policies within the network's packet core<br>- Endpoint device blacklisting and connection to the GSMA Central Equipment Identity Register (CEIR) database, optionally use "greylisting" to allow the temporary suspension of 'suspect' devices whilst the Network Operator investigates the nature of such devices prior to any blacklisting;<br>- Backup channels in case of physical or logical link failure<br>- Identify link failure as evidence of potential security breach<br>1950 |

| |
|---|
| Propagating accumulated information to data analysis module [1400] 1960 |

Fig 5

Data analysis module 1400

Obtaining data from the probe interface module 1300.   1410

Keeping track of all events that have been recorded by the probe interface 1300 in the events database 1100a.   1420
This database serves to analyze network scenarios according to strings of events, as well as singular event occurrences.

Analyzing type of IoT device action, location communication between IoT device, and between cellular device IoT device and ,performing timing patterns and statistics based on IoT cluster groups.   1430
Identifying statistic deviations that exceed pre-defined thresholds for each class group.

Identification and authentication of the entities involved in the IoT Service (i.e. Gateways, Endpoint devices, home network, roaming networks, service platforms). 1435

Analyzing number of action or communication volume and statistics of IoT device and cellar devices . Identifying data volume deviations that exceed pre-defined thresholds per each cluster .   1440

Analyzing content and context of packet-switched messages, to identify:   1450
- relation to URLs and IPs that are labeled as blacklisted or grey-listed according to the threats database. Invoking end-point verification (whois) if necessary.
- DNS address changes on the UCD to prevent traffic redirection to MitM sites. Invoking end-point verification (whois) if necessary.
- upload of sensitive information, or by IP address only (no hostname).
- download of data that is labeled as malicious (e.g.: Viruses, Spyware, Malware) according to the threats database.

Optionally employing machine learning algorithms to IoT devices 1470

Fig 6

Data analysis module [1400] – continued

Analyzing events surrounding the UCD connection to a WiFi network to identify suspicious scenarios, for example:
1490
- Tracking the history of visited websites throughout the period of UCD connection to the WiFi network;
- Detecting suspicious connection to a WiFi network that bears an identical name to a different WiFi network already resident in the IOT list of known networks;
- Detecting suspicious actions, e.g.: surfing a blacklisted site, uploading streaming video or data stored on the UCD, capturing a screen image, or operating the UCD microphone.

Employing the HSS analyzing sub-module [1400b], to analyze access of the HPLMN to the controlled HLR [800] modules, and identify suspicious scenarios, for example: No NDS denial of service
1500

Fig 7

Data analysis module [1400] – continued (Actions)

---

Determining the existence of a security threat, its type and probability, according to the different methods of threat analysis, as elaborated above.

The said determination takes into account per each ITO cluster group:
• the events and threats that have been accumulated by the CCN [100] on its respective databases;
• the profile of threat analysis and suspicious scenarios per cluster, as predefined via the administrative module.

1510

---

Optionally updating the profile of threat analysis per class, according to newly identified security threats or changes of behavior of devices in the class.

1520

---

Determining security measures per cluster to be invoked in response to the said determined security threat type and probability, and emitting a respective activity message to the security action management module 1600. The determination of security measures takes into account:
• The category and probability of the determined security threat for each cluster; and
• The profile of service entitlements per each subscriber.

1530

---

Emitting determined activity messages to the security action management module 1600, in response to switched-packet related threat identification. This may invoke action by the controlled PGW [550] component

1560

---

Emitting determined activity messages to the security action management module 1600 and to the Identity mediation function module, in response to suspected network-based attacks such as location tracking attacks or Man-In-The-Middle attacks. This may invoke action by the controlled HLR, controlled HSS, and identity mediation modules.

1570

---

Notifying the Threats management module [1800] regarding suspicious URLs, IPs, sender addresses. The Threats management module will maintain the Threats database [1100c] of such suspected items for further use.

1580

---

Maintain a log of all events and conditions met during the data analysis process

Security action management module [1600]

Receiving action messages from the data analysis module 1400, following identification of a suspected threat per group class of IOT device. This message contains the security measurements to be taken such as blocking, diverting, logging or alerting, and is based on the identified threat categories and their probability, and the profile of service entitlements per each class /subscriber                                                                                                                                          1610

Accessing the Subscribers' database [1100b] to ascertain whether the specific subscriber is entitled for the required security service, according to their profile of service entitlements.                                                                                                                                                                                                                                                         1620

Employing the controlled GGSN [500] or controlled PGW [550] for manipulating suspicious data communication transactions, for example:                            1640
•blocking download of suspicious data
•blocking upload of suspicious data stored on the IOT device originated from the IOT
•executing end-point verification (whois) network commands Employing the controlled HSS [850] modules to apply actions such as:                                                                                               1660
•change the controlled network's HSS databases.
•provide fabricated ATI responses to mislead tracking attempts.

Maintaining a continuous communication channel between the UCD and the CCN [100] ("Lifeline"), in order to identify hijacking attempts of the IOT device to another network. This communication is implemented as switched packet data, with SMS based communication failback.                                                                                                                                                        1670

Issue alerts to the administrative module 700, elaborating conditions and scenarios which have been identified as suspicious, and measures that have been taken to avert these suspected threats                                                                                                                                                                                                                                              1680

Fig 10

Administrative module 700

| |
|---|
| Providing an interface for configuring the CCN [100] system. 710 |
| Providing an interface to configure the profile of hosting network [200] subscribers, for which the CCN [100] provides security services. 720<br>This profile incorporates various properties, such as:<br>• The number and identity of organizational accounts that incorporate multiple subscribers;<br>• The identity of individual PLMN [200] cellular subscribers, incorporated within each organizational account;<br>• Authorization levels that are attributed to the CCN [100] per each organizational account; and<br>• The profile of each subscriber's service entitlements and threat analysis (e.g.: security measures to be taken in response to identified threats). |
| Providing an interface to configure various properties of the CCN [100], such as: 730<br>• The profile of suspicious scenarios and threat analysis; and<br>• The instantiation of various CCN [100] modules |
| Providing an interface to set up and receive alerts regarding events and actions that have taken place within the CCN [100]. 740 |
| Providing an interface for monitoring and editing the data resident on the system's databases (i.e. the events DB, subscribers DB and threats DB). For example: 750<br>• change the content of a specific subscriber's SISE (e.g. change identity parameters stored on the SIM card);<br>• add or edit specific threats within the treats database. |
| Providing an interface for producing reports regarding events, subscribers and threats that are defined within the CCN [100]. 760 |

Fig 11

SYSTEM AND METHOD FOR SECURING COMMUNICATION AND INFORMATION OF IOT DEVICES THROUGH A CONTROLLED CELLULAR COMMUNICATION NETWORK

FIELD OF THE INVENTION

The present invention generally relates to the field of IoT networks. More specifically, it addresses issues of communication and data security and privacy over cellular networks of IOT devices.

BACKGROUND OF THE INVENTION

FIG. 1 illustrate a block diagram, depicting the activity and configuration of a cellular network of IOT devices, according to prior art.

SUMMARY OF THE INVENTION

The present invention provides: a system for providing security services, for securing the privacy and communication of IoT devices, said system comprising:
  at least one non-transitory computer readable storage device and one or more processors operatively coupled to the storage device on which are stored modules of instruction code which when executed by said one or more processors implements a Controlled Network (CN), interfacing an IoT cellular Network, said Cellular Network hosting a plurality of IoT devices;
  wherein said CN classifies and/or control IoT devices by their type, functionality or behavior;
  wherein said ICN encapsulates communication in between IoT devices with the IoT cellular Network or with enterprises devices, said communication including at least part of: control, and data communications;
  wherein said CN is configured to monitor and analyze parameters and characteristics of said monitored communication in real time or in relation to historically acquired data, including at least one of: time patterns, volumes, destination address, source address, content and context
  wherein said CN is configured to identify statistic deviations exceeding predefined thresholds, based on said analysis of parameters and characteristics of said monitored communication based on classification of the IoT device;
  wherein said CN is configured to identify the occurrence of predefined suspicious events and scenarios, based on said analysis of said monitored communication;
  wherein said CN is configured to identify security threats to the privacy of said IoT devices IoT device and determine said threats' category and probability, based on said analysis of monitored communication and classification of the IoT device;
  wherein the said CN is configured to respond to said security threats in real time or in near-real time and take active measures to avert the said suspected threats;
  wherein application of said active measures depends on the category of identified security threat, the identified threat's probability, and the IoT devices profile.
According to some embodiments of the present invention said CN comprises at least one of:
  At least controlled module, configured to complement the functionality of respective elements of the IoT hosting cellular network
  a security center module (1000), configured to perform at least one of instantiation, configuration, monitoring, analysis and management of the functionality of each of said controlled modules; and
  an administrative module, configured to interface said security center module (1000), and provide an administrator interface for at least one of:
    instantiating controlled modules of one or more CNs;
    configuring said controlled modules of said one or more CNs, to serve IoT devices of the cellular IoT network
    presenting alerts regarding the functionality of the CN and events within the IoT hosting cellular network;
    extracting reports regarding the functionality of the CN and events within the hosting IoT cellular network.
According to some embodiments of the present invention at least one component of the CN (100) is implemented as a service, and executed on the same physical or virtual machines as the home IoT cellular network hardware components. According to some embodiments of the present invention the said security center module (1000) comprises at least one of the following modules:
  CN data analysis module (1400), configured to perform at least one of:
    obtaining the data accumulated by the said CN;
    analyzing parameters and characteristics of said monitored communication in real time or in near-real time, including at least one of: time patterns, volumes, destination address, source address, content and context, and identifying statistic deviations exceeding predefined thresholds;
    analyzing accumulated historical data, pertaining to parameters and characteristics of said monitored communication;
    identifying the occurrence of predefined suspicious events and scenarios on the hosing IoT cellular network based on said analysis;
    identifying security threats to the privacy of IoT devices based on said analysis;
    emitting activity messages to other controlled modules of the CN to avert the said identified security threats, and emitting alert messages to said administrative module and/or IOT device to notify against said identified security threats;
    maintaining an events' database (1100a);
  a security action management module (1600) configured to perform at least one of:
    receiving activity messages from the data analysis module (1400);
    obtaining parameters of served subscriber's profile from a subscriber's database (1100b);
    interfacing and commanding controlled modules (300, 350, 400, 500, 550, 800, 850) within the CN to carry out security actions that are required to avert the said identified security threat, according to the category of identified threat, the identified threat's probability, and the IoT devices' profile;
  and a threats management module (1800), configured to manage and maintain a database (1100c) of the security threats encountered during the activity of the CN (100).
According to some embodiments of the present invention the said security center module (1000) further comprises classifying module, applying the following steps:
  Determining relevant policies
  Identifying IoT device at least one functionality, organization, location, device type, connection characteristics (e.g. bandwidth);

Tracking action performed by the IoT device: type of action, communication with other device, communication request;

dynamic classification of IoT groups device by functionality and behavior;

Identifying behavior patterns which indicate threats for each class (step 1950);

Determining at least one relevant security policies based on behavior pattern;

Define for each class security rules based on identified behavior patterns and at least one determined According to some embodiments of the present invention the data analysis module (1400) is further configured to:

monitor incoming and outgoing communication pertaining to specific functionality executing on the IoT device;

detect significant deviations in said communication from expected communication patterns of said specific mobile applications, wherein said communication patterns include at least one of: source address, destination address, communication volume, communication patterns and communication timing; and analyze said detected deviations to identify illegitimate activity of mobile applications.

According to some embodiments of the present invention wherein:

said security center module (1000) further comprises an identity mediation module (1700), configured to dynamically alter the value of one or more IOT devices (10) identity parameters, said identity parameters including at least one of IMSI, IMEI, IMEISV, MSISDN, Ki, Kc, TMSI, PTMSI, TLLI, ESN;

parameters.

The present invention provides, a method for providing security services, for securing the privacy and communication of IoT devices, wherein at least one non-transitory computer readable storage device and one or more processors operatively coupled to the storage device on which are stored modules of instruction code which when executed by said one or more processors implements a Controlled Network (CN), interfacing a IoT cellular Network, said Cellular Network hosting a plurality of IoT devices, said module instructions comprising:

classifying and/or controlling IoT devices by their type, functionality or behavior;

routing communication in between IoT devices or with the IoT cellular Network or with enterprises devices, said communication including at least part of: control, and data communications;

monitoring and analyzing parameters and characteristics of said monitored communication in real time or in relation to historically acquired data, including at least one of: time patterns, volumes, destination address, source address, content and context identifying statistic deviations exceeding predefined thresholds, based on said analysis of parameters and characteristics of said monitored communication based on classification of the IoT device;

identifying the occurrence of predefined suspicious events and scenarios, based on said analysis of said monitored communication;

identifying security threats to the privacy of said IoT devices IoT device and determine said threats' category and probability, based on said analysis of monitored communication and classification of the IoT device;

responding to said security threats in real time or in near-real time and take active measures to avert the said suspected threats;

wherein application of said active measures depends on the category of identified security threat, the identified threat's probability, and the IoT devices profile.

According to some embodiments of the present invention said instructions further comprising:

Complementing the functionality of respective elements of the IoT hosting cellular network monitoring, analyzing and management of the functionality of each of said controlled modules; and According to some embodiments of the present invention at least one component of the CN is implemented as a service, and executed on the same physical or virtual machines as the home IoT cellular network hardware components.

According to some embodiments of the present invention said instructions further comprising:

obtaining the data accumulated by the said CN;

analyzing parameters and characteristics of said monitored communication in real time or in near-real time, including at least one of: time patterns, volumes, destination address, source address, content and context, and identifying statistic deviations exceeding predefined thresholds;

analyzing accumulated historical data, pertaining to parameters and characteristics of said monitored communication;

identifying the occurrence of predefined suspicious events and scenarios on the hosing IoT cellular network based on said analysis;

identifying security threats to the privacy of IoT devices based on said analysis;

emitting activity messages to other controlled modules of the CN to avert the said identified security threats, and emitting alert messages to said administrative module and/or IOT device to notify against said identified security threats;

maintaining an events' database (1100*a*);

According to some embodiments of the present invention at least one component of the CN is implemented as a service, and executed on the same physical or virtual machines as the home IoT cellular network hardware components.

According to some embodiments of the present invention said instructions further comprising receiving activity messages from the data analysis module;

obtaining parameters of served subscriber's profile from a subscriber's database;

interfacing and commanding controlled modules within the CN to carry out security actions that are required to avert the said identified security threat, according to the category of identified threat, the identified threat's probability, and the IoT devices' profile;

managing and maintain a database of the security threats encountered during the activity of the CN.

According to some embodiments of the present invention said instructions further comprising:

Determining relevant policies

Identifying IoT device at least one functionality, organization, location, device type, connection characteristics (e.g. bandwidth);

Tracking action performed by the IoT device: type of action, communication with other device, communication request;

dynamic classification of IoT groups device by functionality and behavior;

Identifying behavior patterns which indicate threats for each class (step 1950);

Determining at least one relevant security policies based on behavior pattern;

Define for each class security rules based on identified behavior patterns and at least one determined According to some embodiments of the present invention said instructions further comprising:

monitor incoming and outgoing communication pertaining to specific functionality executing on the IoT device;

detect significant deviations in said communication from expected communication patterns of said specific mobile applications, wherein said communication patterns include at least one of: source address, destination address, communication volume, communication patterns and communication timing; and analyze said detected deviations to identify illegitimate activity of mobile applications.

According to some embodiments of the present invention said instructions further comprising:

dynamically alter the value of one or more IOT devices (10) identity parameters, said identity parameters including at least one of IMSI, IMEI, IMEISV, MSISDN, Ki, Kc, TMSI, PTMSI, TLLI, ESN; parameters.

BRIEF DESCRIPTION OF THE DRAWINGS

FIG. 5 is a flow diagram, which depicts the actions of the classification module [1700], according to some embodiments of the present invention.

FIGS. 6, 7 and 8 sequentially depict the flow diagram of the data analysis module [1400], according to some embodiments of the present invention. This module is a part of the Security center module [1000].

FIG. 10 depicts a flow diagram of the security action management module [1600]. This module is a part of the security center module [1000]. It interfaces each of the controlled modules of the CN [100], and acts upon activity messages received from the data analysis module.

FIG. 11 depicts the flow diagram of the administrative module 700. This module provides an interface for configuring the components of one or more CNs [100], to serve cellular subscribers of the hosting IoT cellular network [200] network.

DETAILED DESCRIPTION OF SOME EMBODIMENTS OF THE INVENTION

Figure 1:
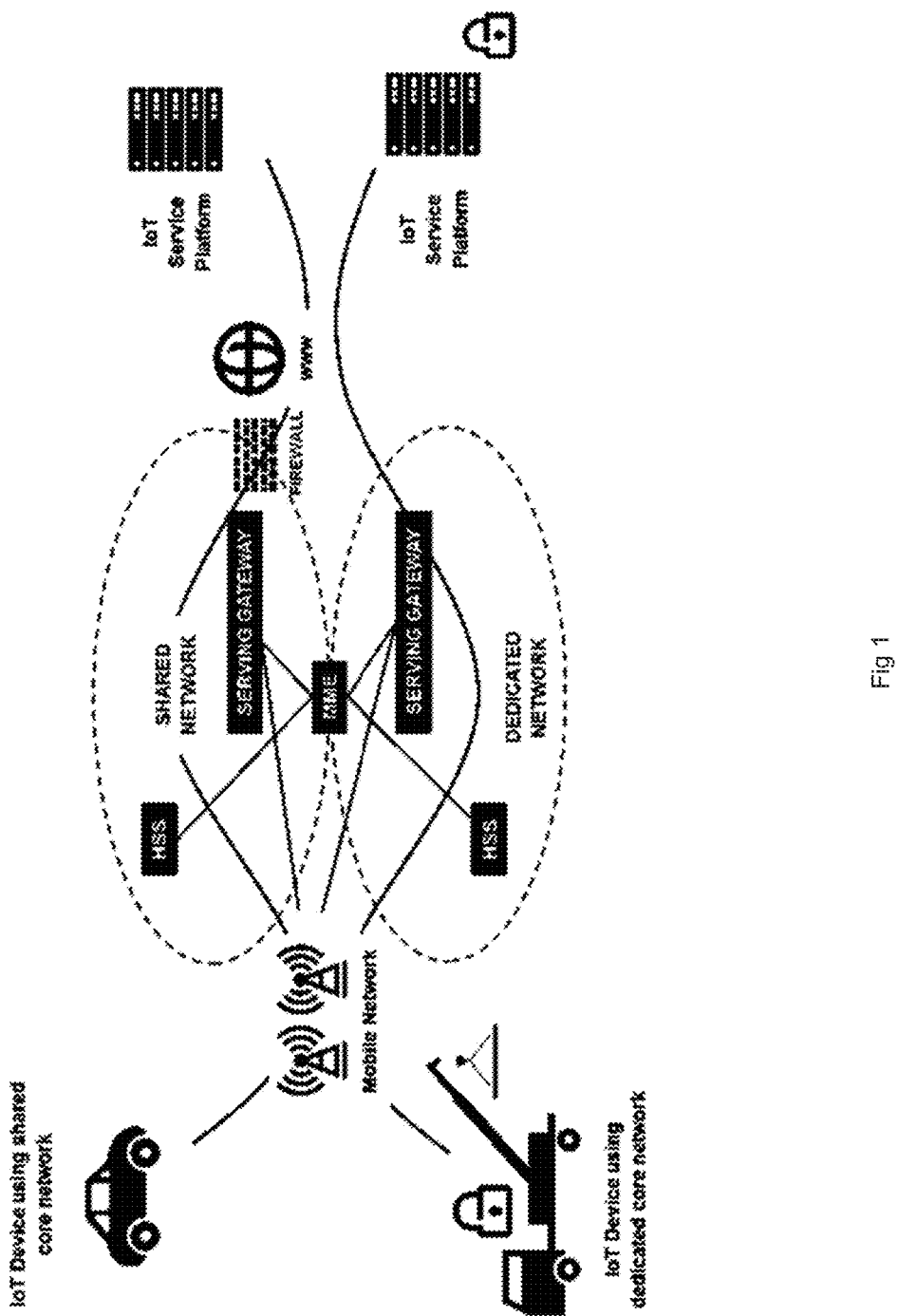
FIG. 1 illustrate a block diagram, depicting the activity and configuration of a cellular network of IOT devices, according to prior art.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Following is a table of definitions of the terms used throughout this application.

| Term | Definition |
| --- | --- |
| IoT cellular network | The hosting cellular communication network for the IoT devices |
| IoT Device(s) | The term IoT device is used throughout this application to describe IoT devices connected through a cellular network.<br>Computing device that connects wirelessly to a network and has the ability to transmit data<br>The Internet of Things (IoT) describes the coordination of multiple machines, devices and appliances connected to the Internet optionally through multiple networks.<br>These devices include everyday objects such as tablets and consumer electronics, and other machines such as vehicles, monitors and sensors equipped with communication capabilities that allow them to send and receive data |
| IoT Service | Any computer program that leverages data from IoT devices to perform the service |
| Controlled Network (CN) | A system designed to enhance the security of IoT device of a hosting IoT cellular network.<br>The CN comprises of one or more controlled modules. Each said controlled modules may be implemented as any combination of hardware and software (e.g. on dedicated machines or as services on the hosting IoT cellular network machines).<br>The CN encapsulates communication between the IoT device and the |

| Term | Definition |
| --- | --- |
| Controlled modules | hosting IoT cellular network Modules comprising the CN, each configured to complement the functionality of respective elements of the hosting IoT cellular network and are configured, monitored and controlled by the Security center module [1000]. |

The invention described henceforth relates to a system and a service that is designed to enhance IOT devices security and privacy. This system is henceforth referred to as the "Controlled Cellular Network (CN)". The CN substitutes or complements the functionality of a hosting IoT cellular network of any standard regardless of the RAT (radio access technologies) (e.g.: GSM, 3GPP, LTE, NB-Iopt, etc, 5G).

The CN [100] is implemented as any combination of hardware and software, and comprises of at least one non-transitory computer readable storage device and one or more processors operatively coupled to the storage device on which are stored modules of instruction code, which when executed by the one or more processors implements the functionality of the CN as explained below.

The CN [100] interfaces the hosting IoT cellular network in a similar manner to the interface of a Mobile Virtual Network Operator (MVNO) with a Mobile Virtual Network Enabler (MVNE) network. This interface accommodates the flow of data between the hosting IoT cellular network and the CN [100] and facilitates at least part of the following functions by the CN [100]:
  Supplementary Services (SS);
  Intelligent Networks (IN) aspects;
  Handling of IoT data communication;
  Tracking location of the IOT devices The CN [100] encapsulates/monitors and controls the interaction of said hosting IoT cellular network with a subset of the IoT cellular network's IoT devices.

The CN [100] monitors and analyzes said monitored communication in respect to each IoT devices, applies novel security measures and provides comprehensive network level security services to all IoT devices, as elaborated in this document further below.

The CN [100] monitors, manages and logs the operation of the protected IoT devices and their interaction with the hosting IoT cellular network. It does so in accordance with designated policies, thus providing individual levels and types of security and privacy services.

According to one embodiment of this invention, the CN [100] monitors, manages and logs the operation of data networks, such as IoT (Internet of Things) networks, connected cars and Machine to Machine networks, to enhance data security and ensure the operational integrity of these data networks.

The CN [100] system's core element is the "Security Center" module. This module:
  Obtains its configuration from an administrative module;
  Interfaces each of the CN's modules;
  Analyzes the communication among the said modules and their activity;
  Detects and determines the probability of existence of specific security threats per each of the protected devices;
  Acts upon threats in real time to ensure the IoT devices security and privacy, in accordance with policy requirements and entitlements, in face of the specific threat category and probability;
  Keeps record of all system events and encountered threats.

The security center may include definitions for different security policies, each IOT device can be associated with more than one security policy. The different policies may be complementary, each providing different type of the security methods or properties. The security policies may be associated to each IOT based on behavior of the IOT device.

The security center accesses and maintains the following databases, upon which it acts to enforce policies of IoT devices security and privacy:
  The IoT databases—withholding a list of IoT devices and (optionally) their profile and or cluster, and their properties (type, function etc.);
  The IoT classification/cluster databases—withholding a list of IoT devices classes by profile and their properties (type, function etc.);
  The threats database—withholding all entities which have been analyzed, and have been found suspicious or threatening; and
  The events database—withholding all networking events that have been collected by the system.

FIG. 1 illustrate a block diagram, depicting the activity and configuration of the a cellular IoT network, according to prior art.
  This diagram exemplifies the use of a dedicated network for the IoT Service by deploying a separate instance of the core network with shared network.

Figure 2:
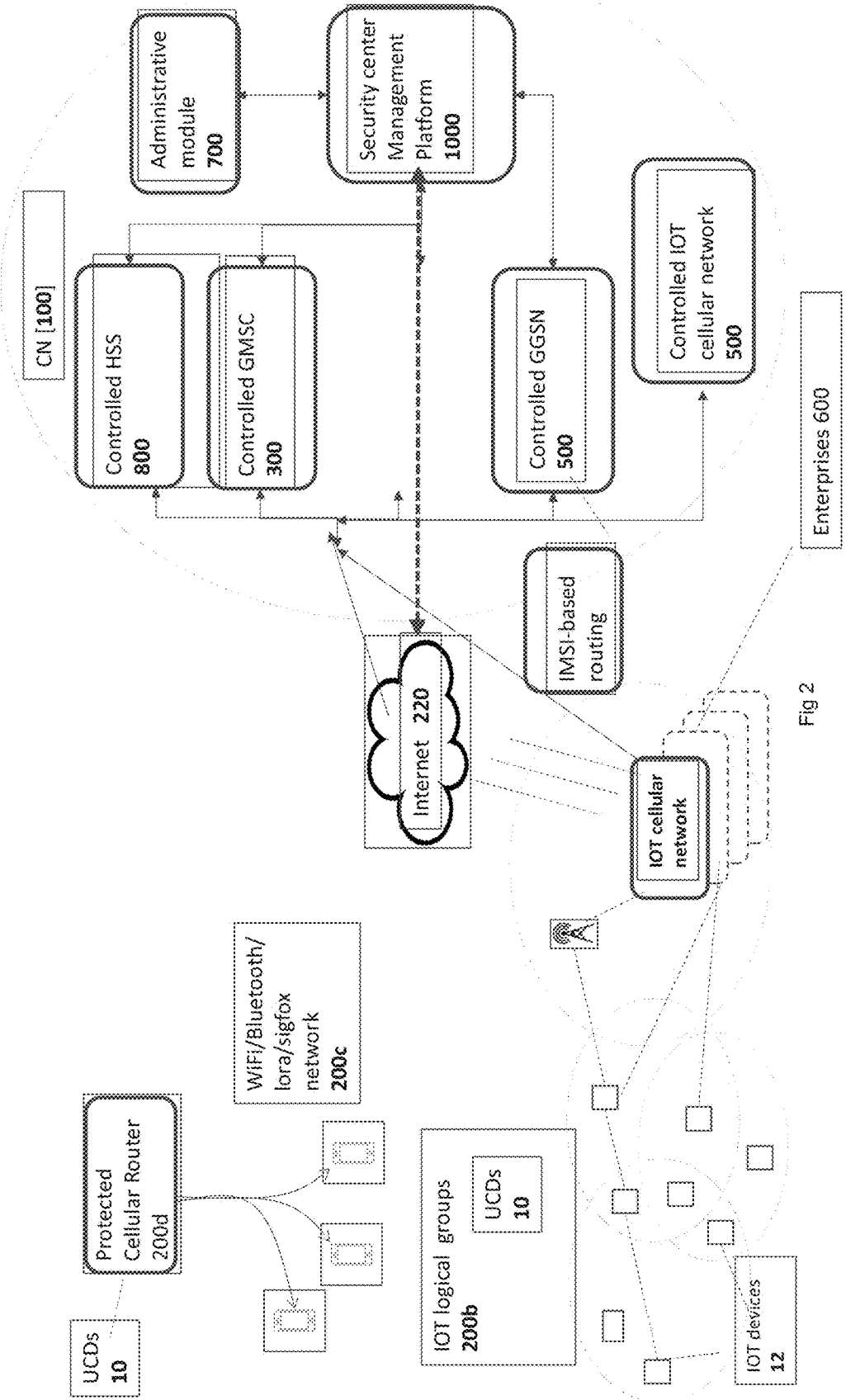
FIG. 2 illustrate a block diagram, depicting the activity and configuration of the Controlled Network (CN) [100] in a cellular IoT network, according to some embodiments of the present invention.
Figure 3:
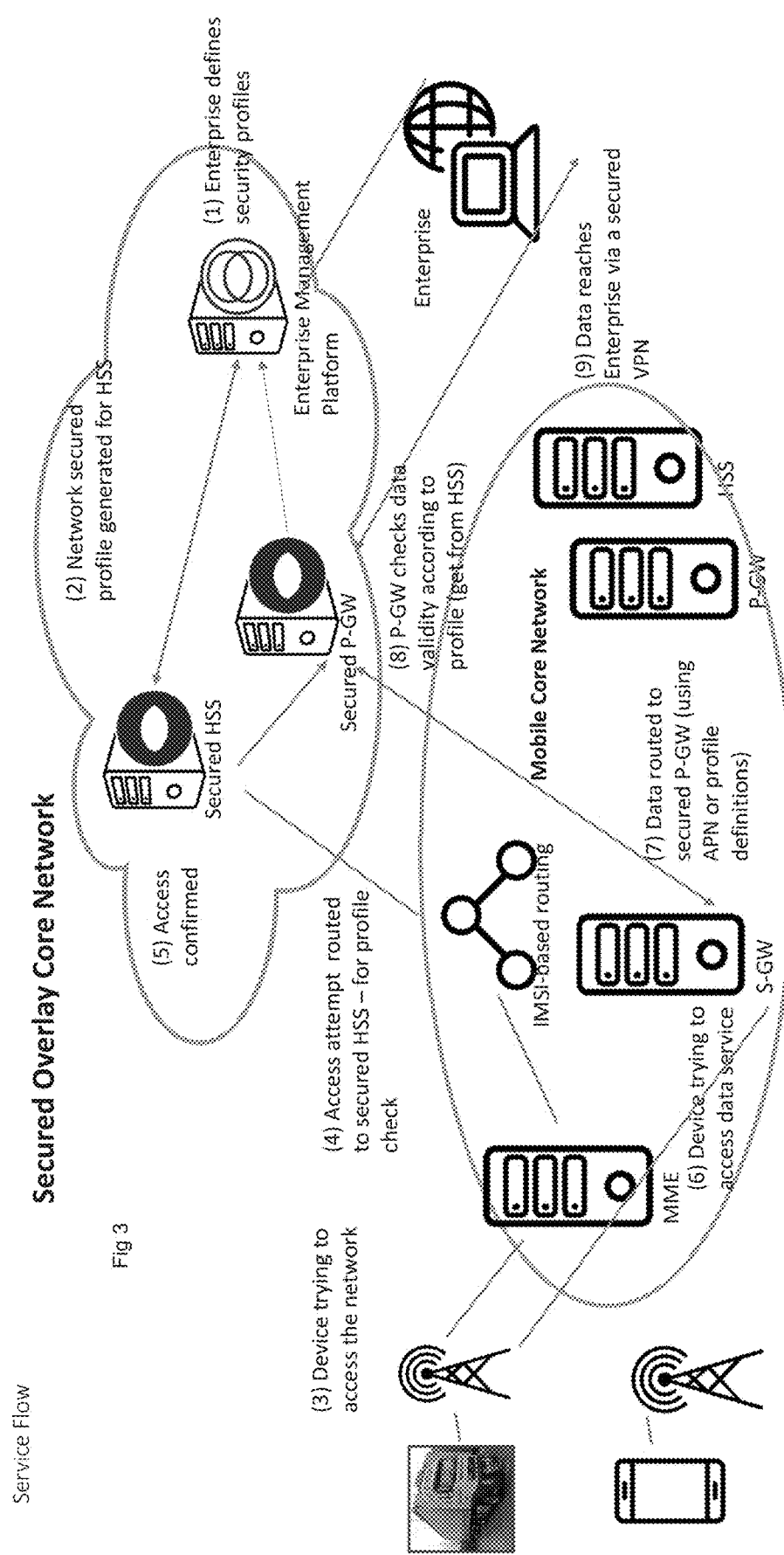
FIG. 3 illustrate a block diagram, depicting the activity and configuration of the overlay core network in a cellular IoT network, according to some embodiments of the present invention.

FIGS. 2 and 3 are block diagrams of the components and environment of a CN [100] system according to the present invention.

The CN system [100] encapsulates all control, management and data transactions that are executed from and towards the IoT devices by the said CN [100]. It monitors and manages all aspects of communication within the CN [100], and between the CN and the hosting IoT cellular network [200].

According to some embodiments of this invention, at least one component of the CN [100] is implemented and executed on either a physical or virtual machine independent of the hosting IoT cellular network.

According to some embodiments of this invention, at least one component of the CN [100] is implemented as a service, and executed on the same physical machines as the home IoT cellular network.

According to one embodiment of the present invention, the CN [100] system may be configured to provide security services to organizational groups of IoT devices of the hosting IoT cellular network [200], according to each organizational group's profile of entitled services.

FIG. 2 depicts the activity of the said CN [100] in IoT cellular network [200] context.

The CN [100] core element is the "Security center" module [1000]. This module [1000] is configured to:
  Interface each of the CN's modules;
  Analyze the communication and activity of the said modules;

Detect and determine the probability of existence of security threats;

Act upon threats in real time, to ensure the IoT devices security and privacy. This is done in accordance with a predefined policy, reflecting the IoT devices requirements and entitlements; and Keep record of all system events and encountered threats.

The administrative module [700] provides an interface to the security center module [1000], and enables administrators to perform at least one of:

Configuring the CN's [100] environment;

Instantiating specific controlled modules within the CN [100];

Defining subsets of hosting IoT cellular network device that are to be granted security services by the CN [100].

Defining the different attributes of said IoT devices (e.g. IoT devices relation to enterprise 600, the level of security services they are entitled to, etc.);

Defining a set of thresholds relating to various parameters and characteristics of host network communication. Said parameters including, for example: time patterns, data volumes, destination address, source address, content, context, etc.;

Defining a set of suspicious events and scenarios that take place in the hosting IoT cellular network [200] network, to be monitored by the CN [100];

Defining specific security measures that are to be taken in the occurrence of said suspicious events and scenarios; and Configuring reports and alerts that would be emitted in the occurrence of said suspicious events and scenarios.

The controlled Home Subscriber Server (HSS) module [850] complements the functionality of the HSS module in 4G cellular systems or similar Home registries in other cellular networks, within the CN [100]. This module [850] holds a database upon which information regarding the IoT devices is kept. It is configured, monitored and controlled by the Security center module [1000].

The controlled Mobility Management Entity (MME) module [350] complements the functionality of the MME module in 4G cellular systems, within the CN [100]. This module [350] serves to route communication between IoT devise of the CN [100] and the hosting PLMN [200]. It is configured, monitored and controlled by the security center module [1000], and provides to the security center module [1000] data regarding hosting PLMN (200) control messages.

The controlled Packet Data Network Gateway (PGW) module [550] complements the functionality of the PGW module in 4G cellular systems, within the CN [100]. This module [550] serves to connect IoT devices to external packet switched networks such as the Internet [220], Machine to Machine (M2M) networks or connected cars data networks.

The controlled PGW module [550] routes packet switched data between the CN [100] and the hosting IoT cellular network, and provides to the security center module [1000] data regarding switched data packets transactions over the hosting IoT cellular network [200].

The controlled PGW module [550] is configured, monitored and controlled by the security center module [1000].

According to one embodiment of the present invention, the CN [100] may be comprised of all the modules depicted within embedded within the existing core network modules, as shown in FIG. 1, or any subset thereof.

FIG. 3 illustrate a block diagram, depicting the activity and configuration of the overlay core network in a cellular IoT network in association with an enterprise, according to some embodiments of the present invention.

The present invention provides a controlled network (CN) comprised of an enterprise security center management platform (100), secured HSS (controlled HSS), Secured P-GW and secured MME.

Incase an IoT device is trying to access the IoT cellular network (mobile core network) (3), the request is processed though the MME, conveying an access attempt to the secured HSS (4), for checking the IOT device profile (4). The secured HSS query the IOT device profile at the security center management platform (100) (2). The security profiles of the IoT devices is determined at the security center management platform.

In case the IoT device network access is confirmed by the secured HSS, the IOT device request access to data service (6) or sending data, is conveyed through the P-GW gateway, the request is routed to the secured P-GW for checking data validity according to IoT device profile provided by the secured HSS. In case the data request is validated the data is conveyed to the enterprise typically through secured (Virtual Private Network) VPN.

Figure 4:
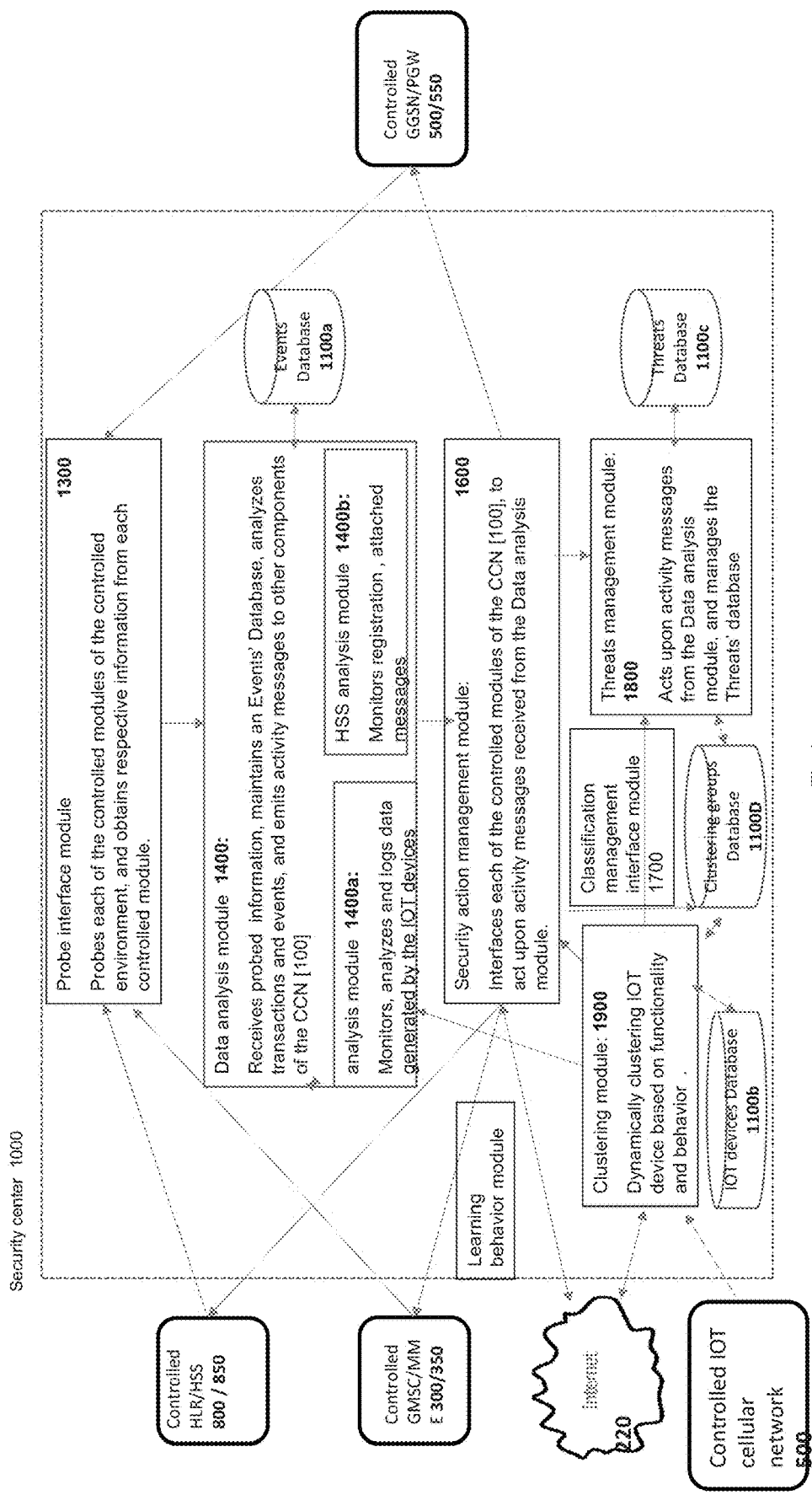
FIG. 4 is a block diagram which depicts the components and environment of the Security center module [1000], according to some embodiments of the present invention. This module is the central component of the CN [100]. It manages the action of all other controlled components and maintains the system's different databases.

FIG. 4 is a block diagram which depicts the components of the security center [1000].

The security center 100 collect from the controlled modules deployed in the CN [100]. It obtains respective information from each of the controlled modules (e.g. controlled HSS [850], controlled MME [3000], etc.), regarding events that occur on the IoT cellular network [200] and regarding communication between elements of the CN [100] and the IoT cellular network.

data locally from hosting the IoT cellular network [200] modules, and propagate the acquired information to the interface module [1300]. This configuration is intended to overcome difficulties that may arise from issues of connectivity or security and permission policies instated within the hosting the IoT cellular network [200] environment.

The data analysis module [1400] is implemented as any combination of software and hardware, and is configured to Receive information from all components;

Maintain the events' database;

Analyze transactions and events that take place on the CN [100] or between the IoT devices;

Identify data security and privacy threats to IoT device; and

Emit appropriate action messages to overcome the said threats.

Examples for different types of threat analysis performed by the analysis module [1400] are:

Identification of predefined suspicious scenarios;

Identification of statistical deviation from predefined thresholds regarding network transaction parameters (e.g.: message timing, frequency, context, patterns, volumes, destination address, contents, etc.); and Identification of known threat related activity (e.g. connection to black-listed websites or downloading of spam messages).

Based on its process of analysis, the data analysis module [1400] emits activity messages to other components of the CN through the security actions module [1600]. Such messages may, for example, invoke immediate security actions or begin long term monitoring of transactions and events within the IoT cellular network [200], to follow up on unfolding scenarios.

Analysis Module 1400a, monitors and analyses data logs generated by the IoT devices, the analysis is based on the profile, functionally and clustering properties to identify deviation from history behavior of the IoT device or the behavior of the related cluster.

The HSS analysis module 100b, monitors registration, supplementary services and intelligent network (IN and CAMEL) messages The events database [1100a] is maintained by the data analysis module [1400]. It is used for keeping track of all events that have been captured and analyzed by the system. This data serves to analyze scenarios based on the occurrence of patterns and sequences of events, as well as for reporting purposes.

According to one embodiment, the data contained in the events database is further processed by a computer, configured to employ machine learning algorithms, and extract information relating to network threats.

The security action management module [1600] acts upon activity messages received from the data analysis module. It interfaces each of the CN [100] components, and applies the required security measures to ensure the privacy and security of the IoT devices.

The IoT device database [1100B] withholds data relating to the identity and profile of IoT devices. The security action management module [1600] accesses the IoT devices database [1100b] to ascertain whether the action required by the activity message is applicable to specific IoT device, according to the profile or cluster of the said IoT devices.

The IoT clustering database [1100C] withholds data relating to groups of IoT devices based on type, functionality and behavior.

The threats management module [1800] acts upon activity messages received from the data analysis module [1400]. It interfaces the threats database [1100c], and manages it to maintain a list of suspicious source and destination IPs, URLs and Point codes of source calls, and data transactions.

According to one embodiment, the threats management module [1800] interfaces the events database 1100a, and employs a processor, configured to apply machine learning algorithms on the data contained in the events database 1100a. In this embodiment, the said machine learning algorithms refine the definitions of specific network threats and threat categories within the threats database [1100c]. Examples for such refinement include:

Identification of new threat categories (e.g. new methods for IOT device-resident data phishing);

Identification of new threats of familiar categories (e.g. new blacklisted URL);

Identification of actions and scenarios taken by familiar or new threats (e.g. actions that aim to identify and track the location of a specific IOT device); and Improving the assessment of a specific monitored event as one that originates from a network threat (e.g. reduce "false positive" alarms).

The threats database module [1100c] is maintained by the threats management module [1800]. It is used for keeping track of all identified threats; blacklisted source and destination addresses (e.g. Point Codes, URLs and IPs), of suspicious communication messages, EMS and MMS messages and data transactions. The data contained in the threats database module [1100c] serves to:

Provide real-time immunity against network threats;
Emit reports portraying the status of threats in the CN's [100] environment; and
Continuously enhance the definitions of threats and threat categories in the CN [100] environment.

Classification/clustering module 1700, classifies IoT devices by their type, functionality or behavior. Optionally creating group clusters based on learning process.

FIG. 5 is a flow diagram, which depicts the actions of the clustering/classifying, module [1900], according to some embodiments of the present invention.

This module applies at least one of the following steps:
Identifying IoT device functionality, organization, location, device type, connection characteristics (e.g. bandwidth); (step 1910)
Tracking action performed by the IoT device: type of action, communication with other device, communication request (step 1920);
dynamic classification of IoT groups device by functionality and behavior (optionally creating clustering groups) (step 1930);
Identifying behavior patterns which indicate threats for each class (step 1950);
Selecting or determining at least one relevant security policy based on behavior pattern;
Define for each class security rules based on identified behavior patterns (step 1960): examples:
Identify link failure as evidence of potential security breach
Creating: Blacklist (forbidden destinations), Whitelist (closed list of allowed destinations), list of Specific applications enabled, list of Specific applications forbidden, schedule of Specific transmission timings allowed or forbidden
Define thresholds for: Packets length, Volume of communication The security rule may include any sequential combinations of the above parameters The security rule may include Any logical combination of the above parameters—possibly dynamically determined according to the behavior of the device or other devices.

IoT Service data being sent between an IoT Endpoint device and the IoT Service Platform—this includes both primary privacy-sensitive data (e.g. end user related data) and commercially exploitable data (e.g. such as actuator control data) which may also have some secondary privacy impact.

The security assets (IMSI, keysets etc.) and network configuration settings (APN, timer values etc.) used within Endpoint devices (including Gateway devices FIGS. 6, 7 and 8 sequentially depict the flow diagram of the data analysis module [1400].

The data analysis module [1400] obtains data from the interface module [1300], originating from all controlled entities within the CN environment (step 1410).

The data analysis module [1400] maintains the events database [1100a], within which it keeps track of all events that have been collected by the controlled components. This data serves to analyze scenarios based on the occurrence of singular events, or strings of events, on the hosting IoT cellular network [200] (step 1420). The said analysis may be performed in real time or near-real time, or based upon longer period of monitoring and accumulation of historical data.

The data analysis module [1400] analyzes cellular communication according to destination, timing patterns (step 1430) and volume (step 1440), identifying statistic deviations that exceed pre-defined thresholds. For example:
Repetitive data messages recurring beyond a predefined frequency may be considered as spamming, or as targeted cyber-attacks against a specific IOT device.
The functionality of IoT device is characterized by specific communication properties. IoT devises functionalities are expected to interface specific online servers and conduct communication of specific type, timing and volume with the said specific servers. The data analysis module [1400] monitors incoming and outgoing communication pertaining to specific functionalities executing on the IoT device. It detects and analyzes significant deviations from expected communication patterns of those specific functionalities. Said functionality-specific communication patterns include at least one of: source address, destination address, communication volume, communication patterns and communication timing. For example:

Preventing voice and SMS services for IoT Services that only require only the use of data bearers.

Where an Endpoint device only connects to a known IoT Service Platform, the subscription associated with the device should only allow connection to a known whitelist of IP address ranges (or domains( If the IoT Service uses voice or SMS, the use of a preconfigured fixed dialing list should be considered.

Identification and authentication of the entities involved in the IoT Service (i.e. Gateways, Endpoint devices, home network, roaming networks, service platforms). (step 1435).

The data analysis module [1400] analyzes the content and context of switched packet messages (step 1450), to identify:

relation to URLs and IPs that are labeled as blacklisted or grey-listed according to the threats database. Invoking end-point verification (who is) if necessary.

DNS address changes on the IoT devices to prevent traffic redirection to MIT sites. Invoking end-point verification (who is) if necessary.

upload of sensitive information, or by IP address only (no hostname).

download of data that is labeled as malicious (e.g.: Viruses, Spyware, Malware) according to the threats database.

According to some embodiments, the data analysis module [1400] is configured to apply machine learning algorithms to the aggregation of data relating to:

packet—switched communication;
signaling messages; and
text messages.

Optionally employing machine learning algorithms to IoT devices (step 1470) learning behavior of action and transactions preformed at the IoT devices.

Analyzing events surrounding the UCD connection to a WiFi network to identify suspicious scenarios, for example (step 1490):

Tracking the history of visited websites throughout the period of UCD connection to the WiFi network;

Detecting suspicious connection to a WiFi network that bears an identical name to a different WiFi network already resident in the IOT list of known networks;

Detecting suspicious actions, e.g.: surfing a blacklisted site, uploading streaming video or data stored on the UCD, capturing a screen image, or operating the UCD microphone.

Employing the HSS analyzing sub-module [1400b], to analyze access of the HPLMN to the controlled HLR [800] modules, and identify suspicious scenarios, for example: No NDS denial of service (step 1500);

The data analysis module [1400] determines the probability of existence of security threats and threat categories, according to the different methods of data analysis, as elaborated above (step 1510).

The data analysis module [1400] updates the profile of known threats and threat categories according to newly identified security threats (step 1520).

The data analysis module [1400] determines whether to invoke security actions in response to the said determined security threat, taking into account:

The type and probability of the determined security threat; and

The profile of service entitlements per each IoT device.

The data analysis module [1400] emits an activity message to the security action management module 1600, in respect to the determined required security action (step 1530). The security action management module 1600 carries out the said security action, as dictated in the data analysis module's [1400] activity message.

The data analysis module [1400] emits activity messages to the Security action management module, in response to switched-packet-related threat identification (step 1560). This will invoke action by the controlled PGW [550] and controlled HSS [500] components, such as blocking the transmission and/or reception of switched data packets.

The data analysis module [1400] emits activity messages to the Security action management module and to the identity mediation module [1700], in response to suspected network-based attacks, such as location tracking attacks or Man-In-The-Middle attacks (step 1570).

The data analysis module [1400] notifies the threats management module [1800] regarding suspicious URLs, IPs, MMS and data transactions. The threats management module [1800] maintains this information in the threats database [1100c] (step 1580).

The data analysis module [1400] maintains a log of all events and conditions met during the data analysis process (step 1590).

Figure 9:
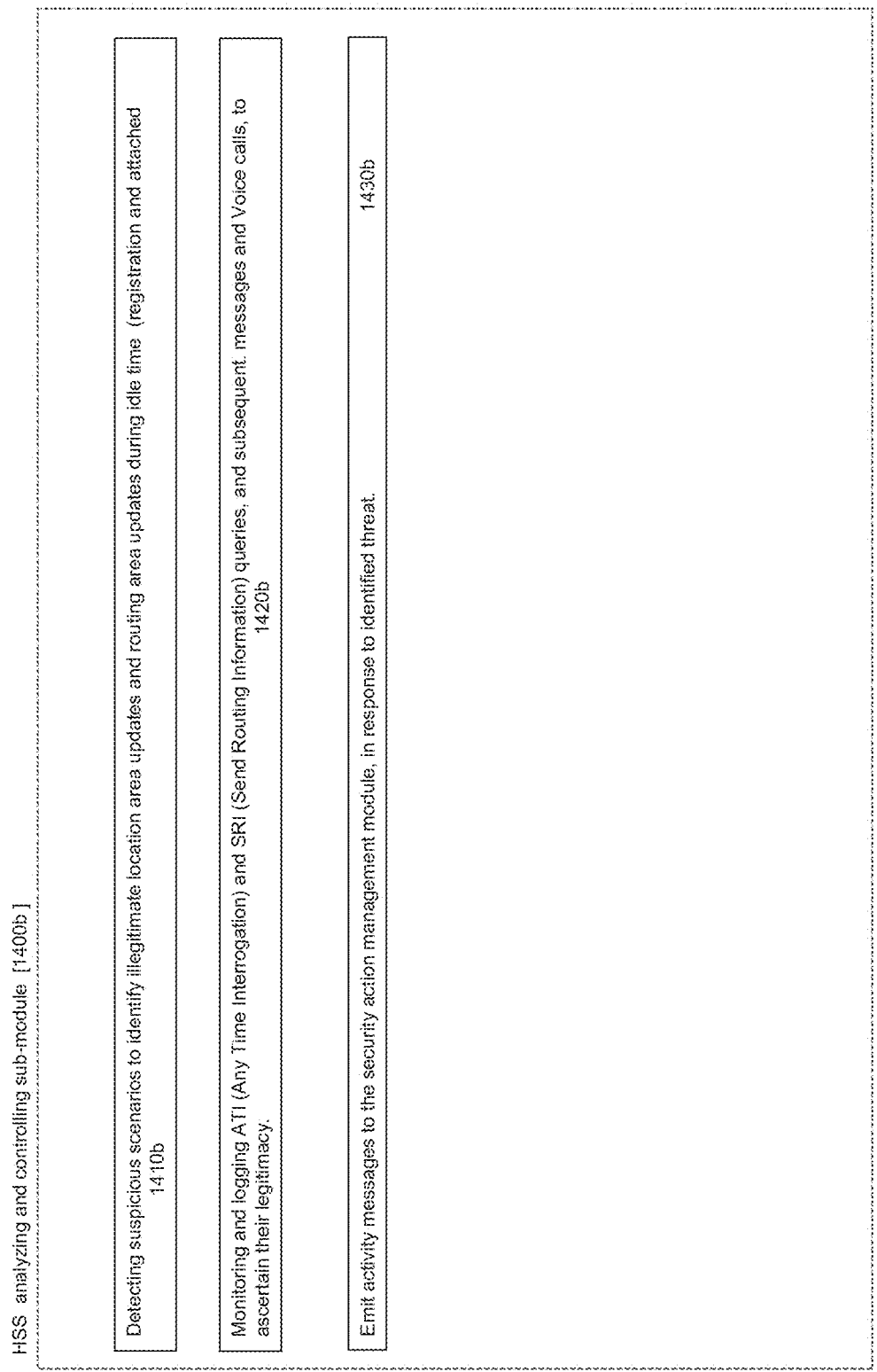
FIG. 9 depicts a flow Home subscriber server (HSS) module [1600], according to some embodiments of the present invention.

FIG. 9 depicts a flow HSS module [1600], according to some embodiments of the present invention. The HSS module apply the Detecting suspicious scenarios to identify illegitimate location area updates and routing area updates during idle time registration and attached 1410b Monitoring and logging signaling messages such as ATI (Any Time Interrogation) and SRI (Send Routing Information) queries, and subsequent. messages, to ascertain their legitimacy. (step 1420b);

Emit activity messages to the security action management module, in response to identified threat. (step 1430b)

FIG. 10 depicts a flow diagram of the security action management module [1600]. This module [1600] receives action messages from the data analysis module 1400, following the identification of a suspected threat (step 1610). These messages contain the security actions to be taken such as:

blocking or diverting messages;
responding to data queries with fictitious data;
logging suspicious events; or
alerting IoT devices regarding suspicious occurrences on their device.

Analyzing signaling stream pattern: prevent certain devices from connecting to their network by changing the communication profile of the affected devices or by enacting security policies within the network's packet core The selection of security actions is based on:
the identified threat category;
suspected threat probability; and
the profile of service entitlements per each IoT devices.

The security action management module [1600] accesses the IoT database [1100b] to ascertain whether the specific IoT device is entitled for the required security service, according to their profile of service entitlements (step 1620).

The security action management module [1600] may command the controlled MME [350] to block suspicious related transactions (step 1630).

The security action management module [1600] may command the controlled PGW [550] to block or manipulating suspicious data communication transactions (step 1640). This may include, for example:
- blocking the download of suspicious data;
- executing an end-point verification ('who is') network command.

The security action management module [1600] may command the controlled HSS [850] modules to apply actions such as (step 1660):
- changing the CN's or HSS databases;
- blocking incoming data s; and
- providing altered responses to ATI or SRI queries, to obfuscate IoT tracking attempts.

The security action management module [1600] issues alerts to the administrative module 700, elaborating conditions and scenarios which have been identified as suspicious, and actions that have been taken to avert these suspected threats (step 1680).

Optional actions may include blocking or diverting communication, alerting serviced subscribers and/or system administrators, responding to system queries with altered data, and logging of suspicious events and scenarios;

FIG. 10 depicts the flow diagram of the administrative module 700. This module provides an interface for configuring the CNs 100 system (step 710).

The administrative module [700] provides an interface to configure the profile of IoT devices. (step 720). The said profile of IoT devices incorporates various properties, including at least one of:
- The number and identity of organizational accounts that incorporate multiple IoT devices, for which the CN [100] provides security services;
- Authorization level attributes per each organizational account/enterprise (e.g.: whether the CN [100] is authorized to block communication for specific IoT device);
- The profile of suspicious scenarios and threat categories per each class of IoT devices; and
- The profile of each class of IoT device entitlements (e.g.: security actions that would be taken in response to identified threats).

The administrative module 700 provides an interface to configure various properties of the CN [100] (step 730), such as:
- The profile of suspicious scenarios and threat analysis; and
- The instantiation of various CN [100] modules.

The administrative module 700 provides an interface to set up and receive alerts regarding events and actions that have taken place within the CN [100] (step 740).

According to some embodiments, the administrative module 700 provides an interface for querying, monitoring and editing the data resident on the system's databases (i.e. the events DB, IoT DB and threats DB) (step 750). This data relates to all aspects of the CN [100] system. Examples for such actions are:
- Changing the properties of specific threats and threat categories stored on the threats database [1100*c*] and;
- Changing the configuration of CN [100] modules (e.g. instantiating or omitting a specific module within the CN [100]).

The administrative module 700 provides an interface for producing reports regarding events, IoT devices and threats that are stored within the respective databases [100] (step 760).

According to some embodiments:
- said security center module (1000) further comprises an identity mediation module (1700), configured to dynamically alter the value of one or more IOT device IOT device (10) identity parameters, said identity parameters including at least one of IMSI, IMEI, IMEISV, MSISDN, Ki, Kc, TMSI, PTMSI, TLLI, ESN or any other identity parameter;
- said identity mediation module (1700) communicates the said alteration of identity parameter values through said Lifeline communication channel to the ULM (20) on the IOT device;
- said ULM (20) module is configured to receive said required alteration of identity parameter values through said lifeline communication channel;
- said ULM module (20) is configured to propagate required alteration of values of identity parameters stored on the IOT Identity Storage Element (IISE (30)), to said IISE (30), said parameters including at least one of IMSI, Ki and Kc;
- said SISE (30) is configured to apply said required alteration of values to identity parameter stored on the ISE (30), said parameters including at least one of IMSI, Ki and Kc;
- said ULM (20) module is configured to apply changes to values of IOT device (10) identity parameter stored on the IOT device; and
- said identity mediation module (1700) is configured to dynamically mediate between said altered IOT device identity parameter values and the original IOT device identity parameters, thus facilitating the routing of the IOT device communication with the hosting PLMN (200) or visited network (200*b*) using the altered identity parameters.

According to some embodiments, said alteration of one or more IOT devices parameter values may be invoked:
- according to a time-based trigger;
- locally on the IOT device (10), according to any logic preconfigured on the ULM (20) or SISE (30);
- locally by the ULM (20) or IISE (30), in response to a failure to receive Lifeline communication;
- remotely, according to any logic preconfigured on the identity mediation module (1700);
- remotely by the identity mediation module (1700), in response to failure to receive Lifeline communication;
- remotely by the identity mediation module (1700), in response to an event on the hosting PLMN (200);
- remotely by the identity mediation module (1700), in response to an activity message from the data analysis module, following an identified suspected threat, including IMSI catcher and Man-in-the-Middle (MitM) attacks; or
- any combination of the above.

According to some embodiments, serviced subscribers' ULMs (20) are configured to possess a set of fallback identity parameter values, whereupon the event of a lifeline communication failure between the security action module (1600) and the ULM of an IOT device:
- the ULM will invoke an alteration of IOT device identity parameters to the said fallback values;
- the IOT device will revert to using said set of fallback parameter values; and
- the ULM will optionally restart the IOT device.

The IOT device will thus be re-introduced to the CN (100) bearing the said fallback identity parameter values.

Figure 12:
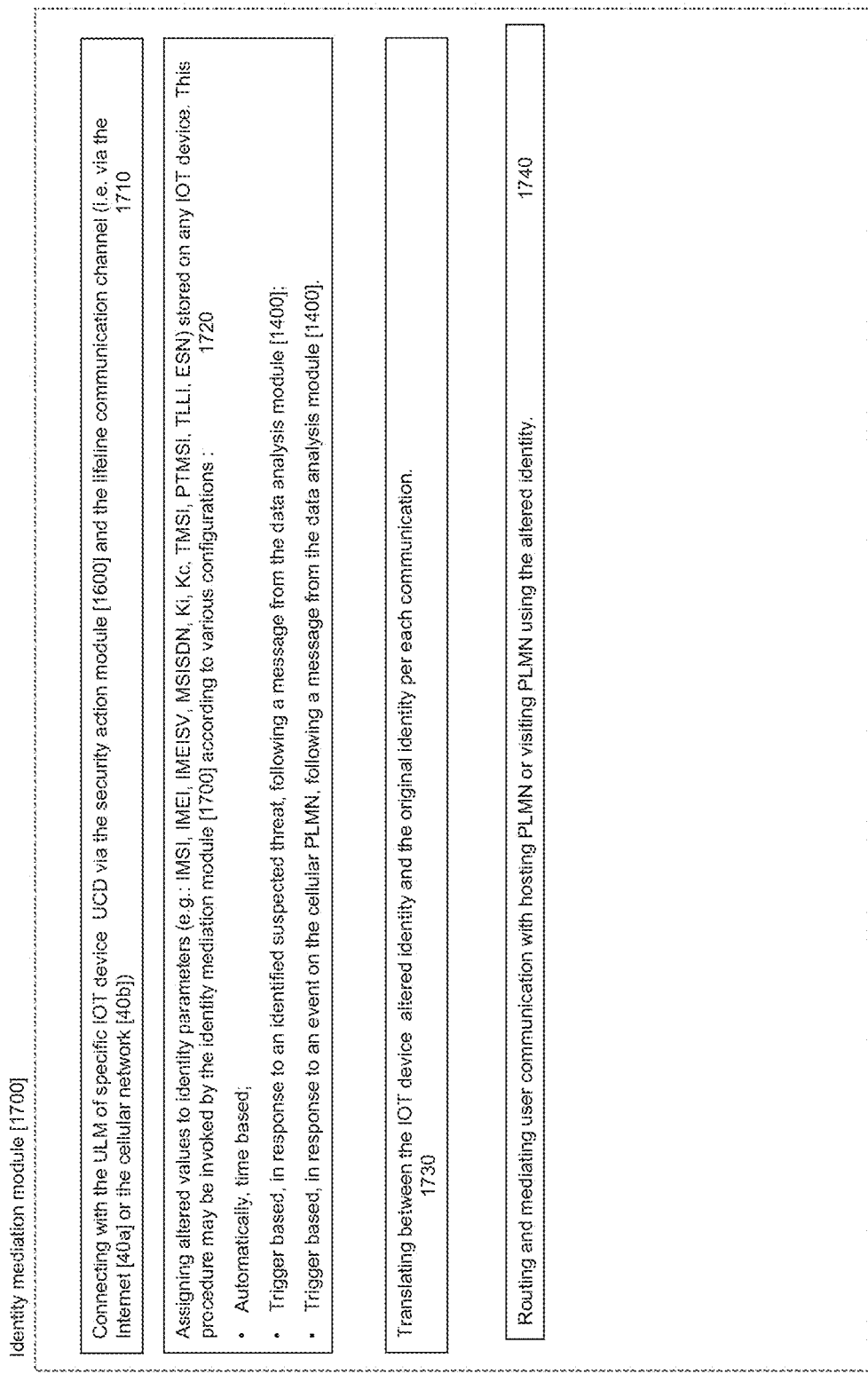
FIG. 12 depicts the flow diagram of the identity mediation module [1700].

FIG. 12 depicts the flow diagram of the identity mediation module [1700].

The identity mediation module [1700] connects with the ULM of specific IOT device via the security action module [1600] and the lifeline communication channel (step 1710), i.e. either through switched data packets [40*a*] over the Internet 220 or USSD messages [40*b*] over the cellular network.

According to one embodiment of the present invention, the identity mediation module [1700] may assign altered values to identity parameters (e.g.: IMSI, IMEI, IMEISV, MSISDN, Ki, Kc, TMSI, PTMSI, TLLI, ESN) stored on any serviced subscriber IOT device (step 1720).

Translating between the IOT device altered identity and the original identity per each communication. (step 1730).

Routing and mediating user communication with hosting PLMN or visiting PLMN using the altered identity. (step 1740)

According to this embodiment, the identity mediation module (1700) communicates the said required alteration of identity parameter values through the Lifeline communication channel to the ULM [20] on the serviced subscribers' IOT device [10]. The ULM [20] may either:
- Propagate the required alteration to the SISE [30], to apply the required alteration of identity parameter values for parameters stored on the SISE [30] (e.g.: IMSI, Ki, Kc), or
- Apply the required alteration to other IOT device identity parameters stored elsewhere on the IOT device [10].

According to one embodiment, the said alteration of IOT device entity parameter values may be invoked according to various configurations, e.g.:
- Automatically, according to a time-based trigger;
- locally on the IOT device [10], according to any logic preconfigured on the ULM [20] or SISE [30];
- locally by the ULM [20] or SISE [30], in response to a failure to receive Lifeline communication;
- remotely, according to any logic preconfigured on the identity mediation module [1700];
- remotely by the identity mediation module [1700], in response to failure to receive Lifeline communication;
- remotely by the identity mediation module [1700], in response to an activity message from the data analysis module, following an event on the hosting PLMN (e.g. the IOT device [10] will respond with a different IMSI each time it is requested to identify);
- remotely by the identity mediation module [1700], in response to an activity message from the data analysis module, following an identified suspected threat, including IMSI catcher and Man-in-the-Middle (MitM) attacks; or
- any combination of the above.

The identity mediation module [1700] mediates between the altered IOT device [10] identity parameter values and the original identity parameter values per each communication (step 1730), and routes the IOT device [10] user communication with the hosting network [200] or visited network [200*b*] using the altered identity. This mediation provides the CN [100] complete control over all forms of communication between the hosting PLMN [200] or visited PLMN [200*b*] and specific IOT devices, for example:

In the event of an identified MitM or IMSI catcher attack, aimed at phishing data from a target IOT device, the system may choose to alter parameters of the IOT device's identity, to avert the phishing attempt.

In the event of having the details of the IOT device identity compromised (e.g. during connection to a Wi-Fi network via a non-protected cellular router), altering of IOT device identity parameters will avert any future cyber-attacks on the target IOT device that are based on the said compromised identity parameters.

According to one embodiment, serviced subscribers' ULMs are configured to possess a set of fallback identity parameter values (e.g. fallback IMSI value, fallback IMEI value etc.). Upon the event of a lifeline communication failure between the security action module [1600] and the ULM of IOT device (e.g. in the case of the IOT device being hijacked to another network), the ULM will invoke an alteration of IOT device identity parameters to the said fallback values. The IOT device will revert to using the set of fallback parameter values, and will thus be re-introduced to the CN [100] bearing the said fallback identity parameter values.

According to one embodiment, the ULM will invoke a IOT device restarted following said alteration of IOT device identity parameters, in cases that require such a restart to enforce the usage of the altered identity parameters by the IOT device.

The system of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

The invention claimed is:

1. A system for providing security services, for securing the privacy and communication of IoT devices, said system comprising:
   at least one non-transitory computer readable storage device and one or more processors operatively coupled to the storage device on which are stored modules of instruction code which when executed by said one or more processors implements a Controlled Network (CN), interfacing a IoT cellular Network, said Cellular Network hosting a plurality of IoT devices;
   wherein said CN classifies and/or control IoT devices by their type, functionality or behavior;
   wherein said CN monitors communication in between IoT devices or with the IoT cellular Network or with enterprises devices, said communication including at least part of: control, and data communications;
   wherein said CN is configured to analyze parameters and characteristics of said monitors communication in real time or in relation to historically acquired data, including at least one of: time patterns, volumes, destination address, source address, content and context;
   wherein said CN is configured to identify statistical deviations exceeding predefined thresholds, based on said analysis of parameters and characteristics of said monitored communication based on classification of the IoT device;
   wherein said CN is configured to identify the occurrence of predefined suspicious events and scenarios, based on said analysis of said monitored communication;
   wherein said CN is configured to identify security threats to the privacy of said IoT devices IoT device and determine said threats' category and probability, based on said analysis of monitored communication and classification of the IoT device;
   wherein the said CN is configured to respond to said security threats in real time or in near-real time and take active measures to avert the said suspected threats;
   wherein application of said active measures depends on the category of identified security threat, the identified threat's probability, and the IoT devices profile;
   further comprising a classifying module, applying the following steps:
      enabling to define relevant security policies rules;
      identifying IoT device by at least one functionality, organization, location, device type, connection characteristics;

tracking action performed by the IoT device: type of action, communication with other device, communication request;
monitoring incoming and outgoing communication pertaining to specific functionalities executing on the IoT device;
real-time dynamic group classification of IoT devices by analyzing behavior pattern based on tracked actions and monitored communication, wherein the behavior pattern analysis is implemented by employing learning algorithms to IoT devices action and communications;
identifying behavior patterns which indicate threats for each class group;
real-time selecting at least one relevant security policy rule from defined relevant security policies rules based on behavior pattern, the dynamic classification and at least one functionality, organization, location, device type, connection characteristics.

2. The system of claim 1, wherein said CN comprises at least one of:
at least one controlled module, configured to complement the functionality of respective elements of the IoT hosting cellular network;
a security center module, configured to perform at least one of instantiation, configuration, monitoring, analysis and management of the functionality of each of said controlled modules; and
an administrative module, configured to interface said security center module, and provide an administrator interface for at least one of:
instantiating controlled modules of one or more CNs;
configuring said controlled modules of said one or more CNs, to serve IoT devices of the cellular IoT network;
presenting alerts regarding the functionality of the CN and events within the IoT hosting cellular network;
extracting reports regarding the functionality of the CN and events within the hosting IoT cellular network.

3. The system of claim 2 wherein at least one component of the CN is implemented as a service, and executed on the same physical or virtual machines as the home IoT cellular network hardware components.

4. The system of claim 2, wherein the said security center module comprises at least one of the following modules:
CN data analysis module, configured to perform at least one of:
obtaining the data accumulated by the said CN;
analyzing parameters and characteristics of said encapsulated communication in real time or in near-real time, including at least one of: time patterns, volumes, destination address, source address, content and context, and identifying statistic deviations exceeding predefined thresholds;
analyzing accumulated historical data, pertaining to parameters and characteristics of said monitored communication;
identifying the occurrence of predefined suspicious events and scenarios on the hosing IoT cellular network based on said analysis;
identifying security threats to the privacy of IoT devices based on said analysis;
emitting activity messages to other controlled modules of the CN to avert the said identified security threats, and emitting alert messages to said administrative module and/or IOT device to notify against said identified security threats;
maintaining an events' database;
a security action management module configured to perform at least one of:
receiving activity messages from the data analysis module;
obtaining parameters of served subscriber's profile from a subscriber's database;
interfacing and commanding controlled modules within the CN to carry out security actions that are required to avert the said identified security threat, according to the category of identified threat, the identified threat's probability, and the IoT devices' profile;
and a threats management module, configured to manage and maintain a database of the security threats encountered during the activity of the CN.

5. The system of claim 4, wherein:
said security center module further comprises an identity mediation module, configured to dynamically alter the value of one or more IOT devices identity parameters, said identity parameters including at least one of IMSI, IMEI, IMEISV, MSISDN, Ki, Kc, TMSI, PTMSI, TLLI, ESN.

6. A method for providing security services, for securing the privacy and communication of IoT devices, wherein at least one non-transitory computer readable storage device and one or more processors operatively coupled to the storage device on which are stored modules of instruction code which when executed by said one or more processors implements a Controlled Network (CN), interfacing a IoT cellular Network, said Cellular Network hosting a plurality of IoT devices, said module instructions comprising:
classifying and/or controlling IoT devices by their type, functionality or behavior;
routing communication in between IoT devices or with the IoT cellular Network or with enterprises devices, said communication including at least part of: control, and data communications;
monitoring and analyzing parameters and characteristics of monitored communication in real time or in relation to historically acquired data, including at least one of: time patterns, volumes, destination address, source address, content and context;
identifying statistic deviations exceeding predefined thresholds, based on said analysis of parameters and characteristics of said monitored communication based on classification of the IoT device;
identifying the occurrence of predefined suspicious events and scenarios, based on said analysis of said monitored communication;
identifying security threats to the privacy of said IoT devices IoT device and determine said threats' category and probability, based on said analysis of monitored communication and classification of the IoT device;
responding to said security threats in real time or in near-real time and take active measures to avert the said suspected threats;
wherein application of said active measures depends on the category of identified security threat, the identified threat's probability, and the IoT devices profile;
defining relevant security policies rules;
identifying IoT device by at least one functionality, organization, location, device type, connection characteristics;
tracking action performed by the IoT device: type of action, communication with other device, communication request;

monitoring incoming and outgoing communication pertaining to specific functionalities executing on the IoT device;

real-time dynamic group classification of IoT devices by analyzing behavior pattern based on tracked actions and monitored communication, wherein the behavior pattern analysis is implemented by employing learning algorithms to IoT devices action and communications;

identifying behavior patterns which indicate threats for each class group;

real-time selecting at least one relevant security policy rule from defined relevant security policies rules based on behavior pattern, the dynamic classification and at least one functionality, organization, location, device type, connection characteristics.

7. The method of claim 6, wherein said instructions further comprising:

complementing the functionality of respective elements of the IoT hosting cellular network; and monitoring, analyzing and management of the functionality of each of said controlled modules.

8. The method of claim 6 wherein at least one component of the CN is implemented as a service, and executed on the same physical or virtual machines as the home IoT cellular network hardware components.

9. The method of claim 6, wherein said instructions further comprising:

obtaining the data accumulated by the said CN;

analyzing parameters and characteristics of said monitored communication in real time or in near-real time, including at least one of: time patterns, volumes, destination address, source address, content and context, and identifying statistic deviations exceeding predefined thresholds;

analyzing accumulated historical data, pertaining to parameters and characteristics of said monitored communication;

identifying the occurrence of predefined suspicious events and scenarios on the hosing IoT cellular network based on said analysis;

identifying security threats to the privacy of IoT devices based on said analysis;

emitting activity messages to other controlled modules of the CN to avert the said identified security threats, and emitting alert messages to said administrative module and/or IOT device to notify against said identified security threats;

maintaining an events' database.

10. The method of claim 6, wherein at least one component of the CN is implemented as a service, and executed on the same physical or virtual machines as the home IoT cellular network hardware components.

11. The method of claim 6, wherein said instructions further comprising receiving activity messages from the data analysis module;

obtaining parameters of served subscriber's profile from a subscriber's database;

interfacing and commanding controlled modules within the CN to carry out security actions that are required to avert the said identified security threat, according to the category of identified threat, the identified threat's probability, and the IoT devices' profile;

managing and maintain a database of the security threats encountered during the activity of the CN.

12. The method of claim 6, said instructions further comprising:

dynamically alter the value of one or more IOT devices identity parameters, said identity parameters including at least one of IMSI, IMEI, IMEISV, MSISDN, Ki, Kc, TMSI, PTMSI, TLLI, ESN.

* * * * *